United States Patent
Cheal

[11] 3,806,941
[45] Apr. 23, 1974

[54] INTRUSION DETECTION SYSTEM

[75] Inventor: James Cheal, Milford, Mich.

[73] Assignee: Omni Spectra, Inc., Farmington, Mich.

[22] Filed: Apr. 10, 1972

[21] Appl. No.: 242,610

[52] U.S. Cl.................... 340/258 A, 325/8, 325/23, 343/7.7, 343/756
[51] Int. Cl............................................ G08b 13/18
[58] Field of Search...... 340/258 A, 258 B; 343/7.7, 343/8, 180; 325/8, 23

[56] References Cited
UNITED STATES PATENTS

| | | | |
|---|---|---|---|
| 2,645,769 | 7/1953 | Roberts................................... | 343/8 |
| 3,024,456 | 3/1962 | Varian et al............................ | 343/8 |
| 3,086,203 | 4/1963 | Hutchison.......................... | 343/180 |
| 3,181,151 | 4/1965 | Clouser.................................... | 343/8 |
| 3,182,322 | 5/1965 | Nankervis.............................. | 343/8 |
| 3,187,329 | 6/1965 | Midlock................................... | 343/8 |
| 3,376,507 | 4/1968 | McEuen et al.............. | 340/258 B X |
| 3,287,729 | 11/1966 | Mark et al........................... | 343/756 |

*Primary Examiner*—David L. Trafton
*Attorney, Agent, or Firm*—Harness, Dickey & Pierce

[57] ABSTRACT

An intrusion detection system including a microwave transmitter for generating plane polarized microwave energy, a microwave antenna which is adapted for radiation and reception of the microwave energy in a predetermined pattern, a duplexer for converting the plane polarized energy from the transmitter into circularly polarized energy for radiation from the antenna and for converting received circularly polarized energy reflected from an object into plane polarized energy having an electric field which is orthogonal to the electric field of the energy from the transmitter, a mixer for mixing the received microwave energy and a small portion of the microwave energy generated by the transmitter to provide a signal having a component representative of the doppler effect, and a receiver for detecting the doppler component to provide a signal representative thereof. The signal representative of the doppler effect is received by a signal processor which converts the signal to a square wave signal of like frequency and integrates the square wave signal to provide an output signal which, upon attaining a predetermined level, indicates the presence of an intruder.

The duplexer includes a polarizer which consists of a plurality of pins which are located within a wave guide and which are aligned at 45° with respect to the electric field of the energy emitted by the transmitter. The receiver has a probe which is slightly skewed with respect to the electric field of the energy emitted by the transmitter, and consequently, is substantially aligned with the electric field of the plane polarized energy reflected from the object after traversing the polarizer.

48 Claims, 8 Drawing Figures

PATENTED APR 23 1974

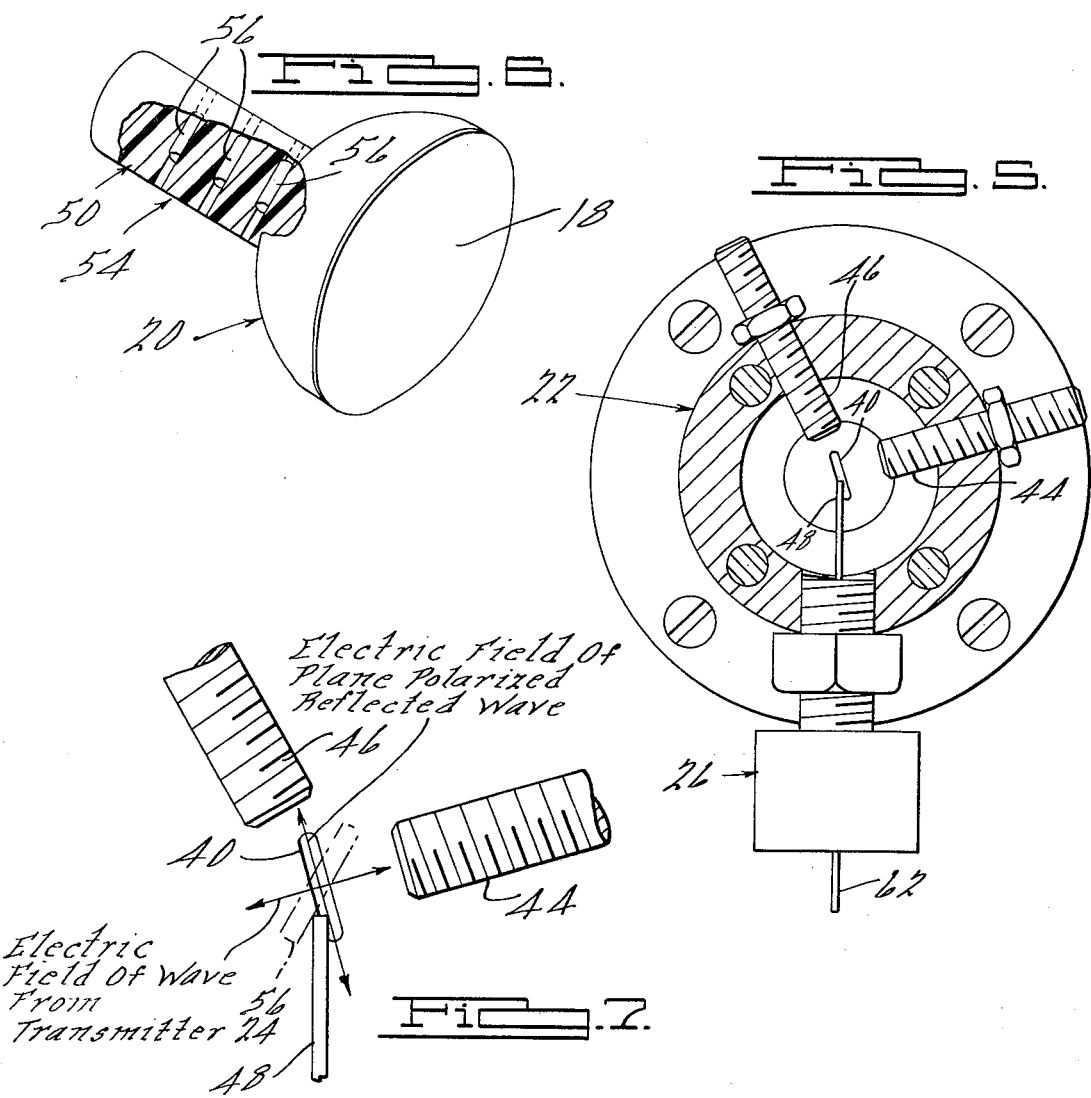
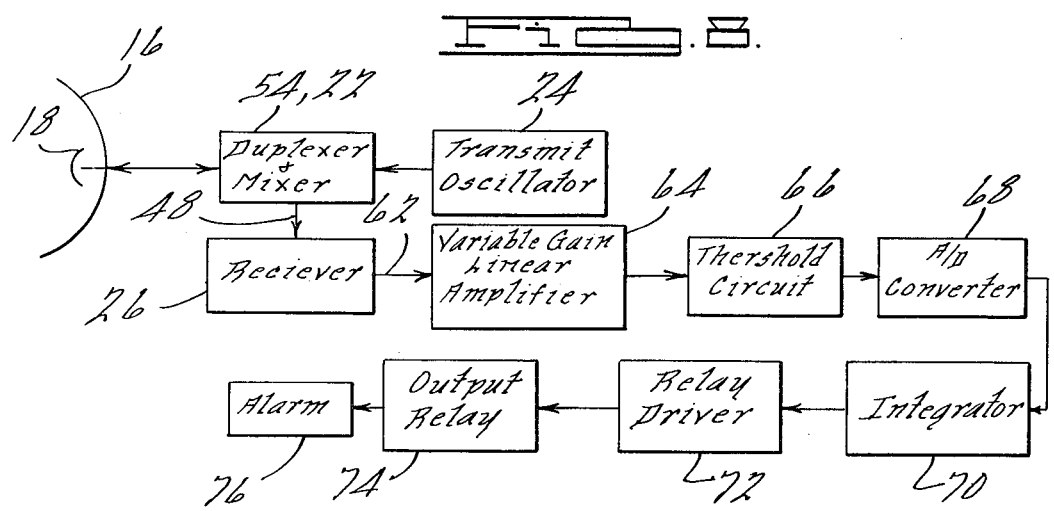

INTRUSION DETECTION SYSTEM

BACKGROUND AND SUMMARY OF THE INVENTION

The present invention relates to a microwave intrusion detecting system which has a compact microwave circuit and is easily and inexpensively manufactured.

In essence, the intrusion detection system of this invention includes a transmitter for generating microwave energy, an antenna for radiating the microwave energy into an area under surveillance and for receiving microwave energy reflected from an object, a receiver for providing a signal representative of the doppler effect, a duplexer for delivering transmitter energy to the antenna and for delivering reflected energy received at the antenna to the receiver, and a signal processor for providing a signal which is indicative of an unwanted intrusion into the area under surveillance.

The duplexer includes a polarizer which comprises a waveguide containing a plurality of pins which are aligned at 45° with respect to the electric field of the energy emitted by the transmitter. In this regard, the transmitter preferably has a slot iris for emitting plane polarized energy. The polarizer of the duplexer converts the plane polarized energy from the transmitter into circularly polarized energy which is radiated from the antenna. Upon reflection from the object, the circularly polarized wave is phase shifted by substantially 180° so that, upon traversing the polarizer, the phase shifted reflected wave is converted to a plane polarized wave having an electric field which is orthogonal to the electric field of the wave emitted by the transmitter. The receiver has a probe which is slightly skewed with respect to the electric field of the energy emitted by the transmitter, and consequently, is substantially aligned with the electric field of the plane polarized reflected energy. Therefore, the receiver probe receives a major portion of the incoming reflected wave and a small portion of the outgoing wave so as to mix the two waves. The mixed waves at the receiver probe have a low frequency component representative of the doppler effect which is detected by a receiver and is utilized to indicate the presence of an intruder.

BRIEF DESCRIPTION OF THE DRAWINGS

FIG. 5 is an end cross-sectional view of the mixer of the intrusion detection system of FIGS. 1-3;

FIG. 6 is a perspective, partially cutaway, view of the polarizer of the intrusion detection system of FIGS. 1-3;

FIG. 7 is an enlarged view illustrating the relative orientations of the microwave circuit components, and FIG. 8 is a block diagram of the signal processor of the intrusion detection system of FIGS. 1-3.

DETAILED DESCRIPTION OF A PREFERRED EMBODIMENT

Figure 1:
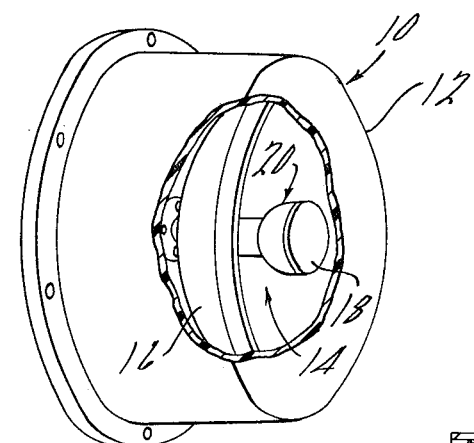
FIG. 1 is a perspective, partially cutaway, illustration of an intrusion detection system according to the present invention.

In FIG. 1, an intrusion detection system 10 is illustrated as having a radome 12 which is shown partially cut away so as to illustrate an antenna 14 which essentially comprises a parabolic dish 16 and a splash plate 18. The splash plate 18 is shown in exaggerated thickness for illustrative purposes. The splash plate 18 is fixedly supported with respect to the reflector 16 by a high density dielectric support member 20.

Figure 2:
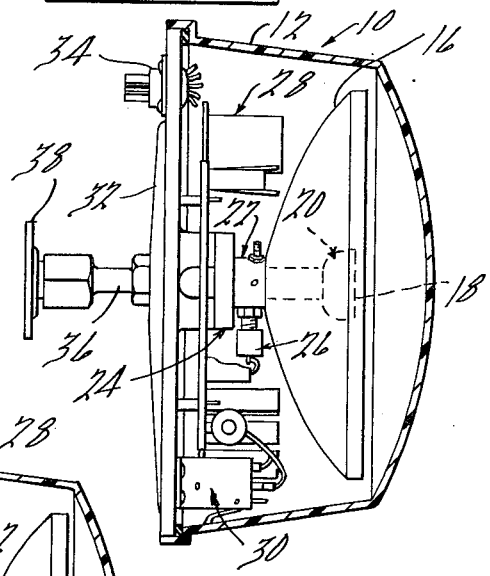
FIG. 2 is a side view, partially in elevation and partially in cross-section, of the intrusion detection system of FIG. 1.
Figure 3:
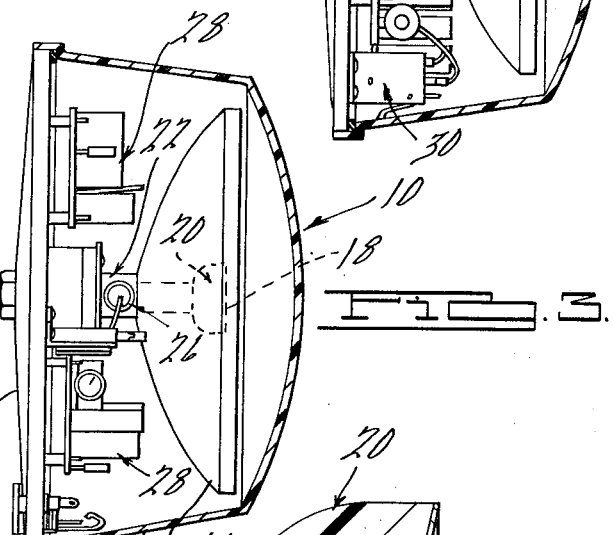
FIG. 3 is a top view, partially in elevation and partially in cross-section, of an intrusion detection system of FIG. 1.

In FIGS. 2 and 3, the intrusion detection system 10 is seen to additionally comprise a mixer section 22, a transmitter section 24, and a receiver section 26. Also shown in FIG. 1 are the outlines of various circuit components for biasing and signal processing as indicated generally by the numeral 28. The intrusion detection system 10 is provided with a base plate 32 which is in sealing engagement with the radome 12. A switch 30 is mounted on the base plate 32 which normally engages the radome and which is adapted to automatically sound an associated alarm if disengaged from the radome 12 as when the radome 12 is removed. A sealed connector structure 34 is also mounted on the base plate 32 for accommodating the various electrical connections of the intrusion detection system 10. The intrusion detection system 10 is adjustably mountable on a wall or other support by means of a pedestal 36 and a universally connected pedestal base 38. While the form of the intrusion detection system 10 of the invention as shown is preferred since it is compact and is in convenient form, it will be appreciated that the intrusion detection system 10 may take other forms.

The splash plate 18 may have one of several configurations to alter the radiation/reception pattern of the system 10. For example, splash plate 18 may have a solid circular configuration, a bisected solid circular configuration, or a ring configuration, i.e., one which is defined by concentric radially outward and radially inward circular boundaries. Preferably, the splash plate 18 is a metallic foil having an adhesive backing providing removable attachment to the dielectric support member 20. The major portion of the microwave energy from the transmitter section 24 is transmitted to the splash plate 18 through the dielectric support member 20 and is reflected therefrom to the dish reflector 16. The radiated wave is substantially focused into a definitive pattern which is adapted for the surveillance of a particular area by selection of a suitable splash plate configuration.

Figure 4:
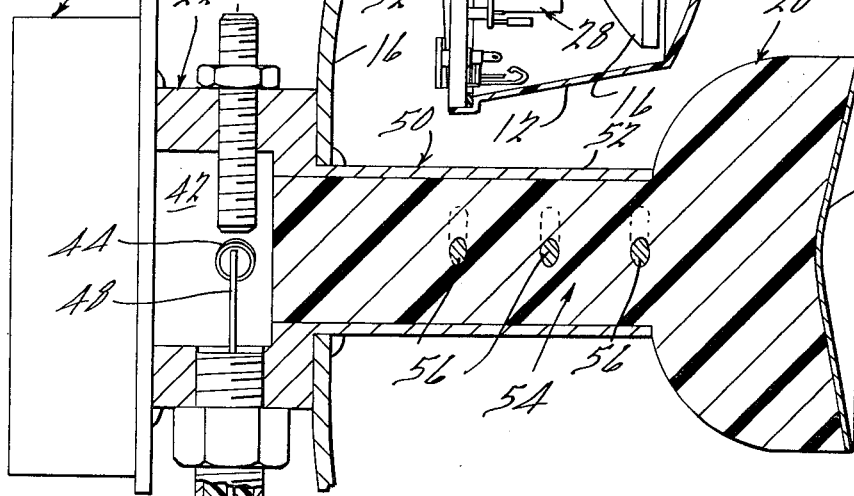
FIG. 4 is a side cross-sectional view of a mixer, receiver, and splash plate for the intrusion detection system of FIGS. 1-3.

In FIG. 4, a cross-sectional view of the splash plate 18, the mixer section 22, and the receiver section 26 is provided which illustrates the exceptional simplicity of the microwave circuitry providing the duplexing, mixing, and receiving functions. The microwave circuitry will be described also with reference to FIG. 5 which illustrates a front cross-sectional view of the mixer taken generally along the lines 5—5 of FIG. 4 and FIG. 7 which is an enlarged isolated view of the microwave circuit components. Microwave energy is generated within the transmitter 24, for example, by biasing a microwave diode, such as an Impatt diode, so that it oscillates in the microwave range. Microwave energy is radiated from the transmitter housing through a slot-type iris or window 40 which provides plane polarized electromagnetic energy with the electric field of the energy being generally orthogonal to the elongated axis of the iris 40. The energy enters a mixing cavity 42 which has a pair of threaded adjustable tuning screws 44 and 46. A receiver probe 48 extends into the cavity 42 at a slight angle to the orthogonal axis of the electric field radiated from the iris 40. The inclination of the receiver probe 48 tends to skew the electric field with respect to an axis orthogonal to the iris 40. The presence of the tuning member 46 compensates for the effect of the skewed receiver probe 48 on the orientation of the electric field of the transmitter energy so that the electric field remains substantially aligned with an axis which is orthogonal to the iris 40. More particularly, the tuning probe 46 is skewed at the same angle with respect to the axis of the iris 40 as the probe 48, but rotated in the opposite direction from the axis of the iris 40, and is radially adjustable to have an equal and opposite effect on the electric field to balance the mixer cavity 42 so as to maintain the electric field orthogonal to the iris 40. In the preferred embodiment of the present invention, the receiver probe 48 and the tuning probe 46 are each skewed at an angle of 15° with respect to the elongated axis of the iris 40, as can be best seen with reference to FIG. 7. The effect of the tuning probe 48 is further balanced by the radially adjustable tuning member 44 which is aligned parallel to the electric field. The tuning probe 48 further serves to match the transmitter oscillatory 24 to the antenna and antenna feed structure.

As seen in FIG. 7, the receiver probe 48 is skewed sufficiently with respect to the axis which is orthogonal to the electric field of the energy emitted by the transmitter 24 so as to extract a small amount of the outgoing microwave energy emitted from the iris 40. As previously stated, in the preferred embodiment, the receiver probe 48 is skewed at an angle of 15° with respect to the axis of the iris 40.

Incoming and outgoing energy is transmitted between the mixer cavity 42 and the splash plate 18 through a single path provided by a cylindrical wave guide 50. The wave guide 50 receives a cylindrical portion 52 of the splash plate support member 20 which contains a polarizer 54 comprising three pins 56 which are axially spaced apart somewhat less than one-fourth of a wavelength of the mean operating frequency of the transmitter 24. More specifically, the pins 56 are spaced apart in accordance with their value of reactance as determined in part by the length of the pins. The reactance of the pins, which is predominantly capacitive in nature, phase shifts the wave traversing the polarizer which, in effect, provides an apparent reduction in quarter wave length distance. The pins are positioned at apparent quarter wave length intervals so as to provide suitably low distortion of the wave traversing the polarizer 54. The pins are preferably equally spaced and are preferably of the same length, however, variable lengths and spacing may be used with the two being interrelated to provide the desired low distortion of the wave traversing the polarizer 54. With reference now to FIG. 7, the pins 56 are aligned at an angle of 45° with respect to the outgoing electric field. The location of the pins 56 can be best seen in FIG. 6 in which the splash plate support member 20 is shown cut away to reveal the pins 56. As can be seen in FIG. 9, the pins 56 are centrally located with respect to the cylindrical portion 52 of the splash plate support member 20 and have a length which is approximately one-half of the diameter of the cylindrical portion 52. The number of pins can be increased to increase the bandwidth of the polarizer 54, however, three pins have been found to provide a suitable bandwidth.

With reference to FIG. 7, the pins 56 are aligned at an angle of 45° with respect to the outgoing electric field. The pins 56 of the polarizer 54 convert the plane polarized wave from the iris 40 to a circularly polarized wave comprising two components having orthogonal electric fields, with one component lagging the other component in phase by 90°. A substantial portion of the circularly polarized wave impinges on the splash plate 18 and is reflected toward the parabolic reflector 16. It should be noted that the support member 20 has a concave face so that the splash plate 18 assumes a conical configuration which is established in accordance with the focal point of the parabolic dish 16.

Energy reflected from an object such as an intruder is shifted in phase by 180° such that the component of the outgoing circularly polarized wave which was leading in phase by 90° is consequently lagging in phase by 90°. When the reflected portion reenters the polarizer 54 by reflection from the reflector 16 onto the splash plate 18, the circularly polarized wave is converted to a plane polarized wave having an electric field which is orthogonal to the electric field of the outgoing wave, as seen in FIG. 7. Thus, the orthogonal relationship between the outgoing and reflected wave is due to the phase reversal which occurs on reflection of the wave from an object. Consequently, the electric field of the incoming wave is substantially aligned with the reciver probe 48 such that a major portion of the received energy is coupled to the probe 48. Therefore, it can be seen then that the receiver probe 48 receives a major portion of the incoming reflected wave and a small portion of the outgoing wave so that a mixing of the two waves occurs at the receiver probe 48. The extension of the probe 48 into the mixer cavity 42 is established to optimize the detection of the doppler signal by providing a good impedance match between the receiver 26 and the cavity 42 to in turn provide an optimum power transfer from the mixer cavity 42 to the receiver 26.

When transmitted energy is reflected by a moving object, the frequency of the received energy is shifted by an amount proportional to the speed of the object. The signal resulting from the mixing of the reflected signal with the small portion of the transmitted signal has a low frequency component representative of the frequency shift which is detected at a diode 58 of the receiver 26 to provide a low frequency signal representative of the difference in the frequencies of the transmitted and received waves. For example, the diode 58 may be a Schottky barrier diode. The diode 58 is preferably self-biased. That is, the diode converts microwave energy within the mixer cavity 42 into a suitable DC biasing potential. The angulation of the probe 48 relative to the axis of the iris 40 is established so as to provide an optimum diode bias for greatest receiver sensitivity and highest signal-to-noise ratio. In this regard, the mixer cavity housing may be provided with a circumferentially elongated slot for mounting the receiver 26 in a manner to provide an adjustment of the probe angulation to optimize the bias of the diode 58.

The bandwidth of the receiver is designed to reject signals which are outside of the frequency range of interest, i.e., signals which are above or below the frequency range within which doppler signals are found which are typically caused by intruders. For example, signals that are above the bandwidth can be caused by outside interference while signals below the bandwidth may be caused by low rate power shifts. A capacitive member 60 is interposed between the receiver probe 48 and the receiver housing 26 to provide an AC block whereby only the low frequency doppler signals will appear at the exposed end portion 62 of the receiver probe 48.

The receiver is also sensitive to amplitude changes caused by the moving object, for example, due to a multipath effect. In this regard, an object moving generally traversely of the central axis of radiation/reception pattern of the intrusion detection system 10 will return microwave energy to the receiver 26 over more than a single path thereby resulting in the reinforcement and the cancellation of the received energy at the intrusion detection system 10 over all paths as the object traverses the pattern which will provide amplitude variations in the signal from the receiver 22 which are within the bandwidth of the receiver. This effect is especially prevalent at long ranges since the receiver is not operating in a saturated condition. The amplitude modulated signal obtained thereby is also indicative of an intrusion, and consequently, the capability of the intrusion detection system 10 is enhanced due to its amplitude modulation sensitivity.

It will be appreciated that the components of the mixer section 22, in combination with the polarizer 54, also provide the duplexing function. More specifically, the orientation of the probe 48 and the orientation of the transmitter iris 40 provides duplexing as well as mixing since the orientations are responsible for providing substantial signal isolation between the transmitter energy and the reflected energy, and also serve to mix the transmitter energy with a small portion of the reflected energy. In view of the duplication of function as explained above, an exceptionally compact microwave circuit is provided of relatively few structural parts. In addition, it should be noted that many of the various component parts of the duplexer, mixer, transmitter, and receiver are basically cylindrical parts so that they may be easily fabricated at low cost on automatic screw machines. Therefore, not only is a compact microwave circuit provided of relatively few components, the components comprising the microwave circuit are inexpensively duplicated so as to provide a doppler radar system of unexpectedly low cost so as to make such systems available to homeowners, small shop owners, and the like.

In FIG. 10, the processing circuit for the intrusion detection system 10 is shown in block diagram. In the Figure, the parabolic reflector 16, the splash plate 18, the duplexer and mixer sections which include the components at 54 and 22, the transmitter section 24, and the receiver section 26, as previously described, are shown. The output from the receiver on line 62 is received by a linear amplifier 64 which has a variable gain control to provide range adjustment. Preferably, the variable gain control is calibrated in range to facilitate the set-up of the intrusion detection system 10. The output of the linear amplifier 64 is received by a threshold circuit 66 which has a response threshold which is established to reject system noise and low amplitude signals so as to provide an acceptable false alarm rate. For a given threshold setting, the probability of a false alarm decreases as the receiver gain is reduced. The output of the threshold circuit 66 is received by an analogue-to-digital converter 68 which provides a train of constant area pulses at a frequency equal to the detected doppler frequency. The output of the analogue-to-digital converter is received by an integrator 70 which provides an output signal upon the occurrence of a sufficient number of pulses during a given time period which occurrence indicates that it is likely that an intrusion has occurred. In practice, the system probability of detection is approximately 99.9 percent. The output of the integrator 70 is delivered to a relay drive 72 which provides an output signal of sufficient magnitude to drive an output relay 74. The output relay 74 is connected to an alarm 76 or other means for indicating the presence of an intruder.

It will be appreciated by those skilled in the art that the preferred embodiment of the invention disclosed herein is susceptible to modification, variation and change without departing from the proper scope or fair meaning of the subjoined claims.

In the claims:

1. An intrusion detection system comprising:
   antenna means for receiving and radiating circularly polarized electromagnetic energy;
   transmitting means for generating plane polarized electromagnetic energy having an electric field oriented in a first predetermined direction;
   receiving means for receiving plane polarized electromagnetic energy having an electrical field oriented in a second predetermined direction which is substantially orthogonal with respect to said first predetermined direction, said receiving means including detecting means for detecting a low frequency component of said received electromagnetic energy for providing an output signal which is indicative of an intrusion; and
   duplexing means including polarizing means for converting said generated plane polarized electromagnetic energy into circularly polarized electromagnetic energy, for communicating said circularly polarized energy to said antenna means for radiation therefrom, for converting said circularly polarized electromagnetic energy received by said antenna means into plane polarized electromagnetic energy having an electrical field in said second predetermined direction, and for communicating said received plane polarized electromagnetic energy to said receiving means in a manner so that said polarizing means provides substantial isolation between said received electromagnetic energy, said polarizing means including a plurality of spaced rod-like elements interposed in and traversely extending relative to a single path between said antenna means and both of said transmitting means and said receiving means.

2. An intrusion detection system according to claim 1 wherein said single path is along a predetermined axis of said polarizing means and wherein said plurality of spaced rod-like elements are on said axis and have the same rotational alignment with respect to said axis.

3. An intrustion detection system according to claim 2 wherein said plurality of spaced rod-like elements are rotationally aligned with respect to said axis intermediately of said first and second predetermined directions.

4. An intrusion detection system according to claim 3 wherein said plurality of spaced rod-like elements are axially aligned at substantially 45° with respect to said first and second predetermined directions.

5. An intrusion detection system according to claim 1 further including a wave guide which provides said single path and wherein said plurality of spaced rod-like elements are disposed within said wave guide.

6. An intrusion detection system according to claim 5 wherein said wave guide is a cylindrical wave guide.

7. An intrusion detection system according to claim 1 wherein said receiving means further includes a probe extending in said second predetermined direction for receiving at least a major portion of said received plane polarized electromagnetic energy.

8. An intrusion detection system according to claim 7 wherein said receiving means probe is skewed at a relatively small angle relative to said second predetermined direction for additionally receiving a small portion of said generated plane polarized electromagnetic energy whereby said generated plane polarized electromagnetic energy and said received plane polarized electromagnetic energy are mixed at said probe.

9. An intrusion detection system according to claim 7 further including wall means defining a mixing chamber, said probe being located within said mixing chamber and said plurality of rod-like elements being outside of said mixing chamber.

10. An intrusion detection system according to claim 9 further including a wave guide which defines said single path and wherein said plurality of spaced rod-like elements are within said wave guide.

11. An intrusion detection system according to claim 10 wherein said mixing chamber and said wave guide are cylindrical.

12. An intrusion detection system according to claim 1 wherein said transmitting means includes wall means providing a slot-type iris for emitting said generated plane polarized electromagnetic energy.

13. An intrusion detection system according to claim 1 wherein said plurality of spaced rod-like elements are spaced in accordance with one quarter of the effective wave length of said generated and received plane polarized electromagnetic energy.

14. An intrusion detection system according to claim 1 wherein said plurality of spaced rod-like elements are equally spaced.

15. An intrusion detection system according to claim 1 wherein said plurality of spaced rod-like elements are of equal length.

16. An intrusion detection system according to claim 7 further including a tuning member disposed oppositely of said receiving means probe which extends in said second predetermined direction.

17. An intrusion detection system according to claim 16 wherein said receiving means probe is skewed at a relatively small angle relative to said second predetermined direction for additionally receiving a small portion of said generated plane polarized electromagnetic energy whereby said generated plane polarized electromagnetic energy and said received plane polarized electromagnetic energy are mixed at said probe.

18. An intrusion detection system according to claim 16 wherein said tuning member is skewed at said relatively small angle relative to said second predetermined direction rotationally oppositely of said receiving means probe.

19. An intrusion detection system according to claim 7 further including a tuning member extending in said first predetermined direction.

20. An intrusion detection system according to claim 19 wherein said tuning member is aligned with said first predetermined direction.

21. An intrusion detection system according to claim 1 wherein said transmitting means includes wall means providing a slot-type iris for emitting said generated plane polarized electromagnetic energy, said receiving means includes a probe extending in said second predetermined direction for receiving at least a major portion of said received plane polarized electromagnetic energy, and said plurality of spaced rod-like elements are aligned intermediately of said first and second predetermined directions.

22. An intrusion detection system according to claim 21 further including a wave guide which provides said single path and wherein said plurality of spaced rod-like elements are disposed within said wave guide.

23. An intrusion detection system according to claim 22 further including wall means defining a mixing chamber, said probe being located within said mixing chamber and said plurality of rod-like elements being outside of said mixing chamber.

24. An intrusion detection system according to claim 23 wherein said mixing chamber and said wave guide are cylindrical.

25. An intrusion detection system according to claim 24 wherein said receiving means probe is skewed at a relatively small angle relative to said second predetermined direction for additionally receiving a small portion of said generated plane polarized electromagnetic energy whereby said generated plane polarized electromagnetic energy and said received plane polarized electromagnetic energy are mixed at said probe.

26. An intrusion detection system according to claim 25 further including a turning member disposed oppositely of said receiving means probe which extends in said second predetermined direction.

27. An intrusion detection system according to claim 26 wherein said turning member is skewed at said relatively small angle relative to said second predetermined direction rotationally oppositely of said receiving means probe.

28. An intrusion detection system according to claim 27 further including a tuning member extending in said first predetermined direction.

29. An intrusion detection system according to claim 28 wherein said turning member is aligned with said first predetermined direction.

30. An intrusion detection system according to claim 1 wherein said electromagnetic energy is in the microwave range.

31. A doppler system comprising:
antenna means for receiving and radiating circularly polarized electromagnetic energy;
transmitting means for generating plane polarized electromagnetic energy having an electric field oriented in a first predetermined direction;
receiving means for receiving plane polarized electromagnetic energy having an electrical field oriented in a second predetermined direction which is substantially orthogonal with respect to said first predetermined direction, said receiving means including detecting means for detecting a low frequency component of said received electromagnetic energy for providing an output signal which is representqative thereof; and duplexing means including polarizing means for converting said generated plane polarized electromagnetic energy into circularly polarized electromagnetic energy, for communicating said circularly polarized energy to said antenna means for radiation therefrom, for converting said circularly polarized electromagnetic energy received by said antenna means into plane polarized electromagnetic energy having an electrical field in said second predetermined direction, and for communicating said received plane polarized electromagnetic energy to said receiving means in a manner so that said polarizing means provides substantial isolation between said received electromagnetic energy and said generated electromagnetic energy, said polarizing means including a plurality of spaced rod-like elements interposed in and traversely extending relative to a single path between said antenna means and both of said transmitting means and said receiving means.

32. A doppler system according to claim 31 wherein said single path is along a predetermined axis of said polarizing means and wherein said plurality of spaced rod-like elements are on said axis and have the same rotational alignment with respect to said axis.

33. A doppler system according to claim 32 wherein said plurality of spaced rod-like elements are aligned intermediately of said first and second predetermined directions.

34. A doppler system according to claim 33 wherein said plurality of spaced rod-like elements are aligned at substantially 45° with respect to said first and second predetermined directions.

35. A doppler system according to claim 31 further including a wave guide which provides said single path and wherein said plurality of spaced rod-like elements are disposed within said wave guide.

36. A doppler system according to claim 35 wherein said wave guide is a cylindrical wave guide.

37. A doppler system according to claim 31 wherein said receiving means further includes a probe extending in said second predetermined direction for receiving at least a major portion of said received plane polarized electromagnetic energy.

38. A doppler system according to claim 37 wherein said receiving means probe is skewed at a relatively small angle relative to said second predetermined direction for additionally receiving a small portion of said generated plane polarized electromagnetic energy whereby said generated plane polarized electromagnetic energy and said received plane polarized electromagnetic energy are mixed at said probe.

39. A doppler system according to claim 37 further including wall means defining a mixing chamber, said probe being located within said mixing chamber and said plurality of rod-like elements being outside of said mixing chamber.

40. A doppler system according to claim 39 further including a wave guide which defines said single path and wherein said plurality of spaced rod-like elements are within said wave guide.

41. A doppler system according to claim 40 wherein said mixing chamber and said wave guide are cylindrical.

42. A doppler system according to claim 41 wherein said transmitting means includes wall means providing a slot-type iris for emitting said generated plane polarized electromagnetic energy.

43. A doppler system according to claim 41 wherein said plurality of spaced rod-like elements are spaced apart a distance which is substantially equal to one quarter of the effective wave length of said generated and received plane polarized electromagnetic energy.

44. An intrusion detection system comprising:

antenna means for receiving and radiating circularly polarized electromagnetic enrergy;

transmitting means for generating plane polarized electromagnetic energy having an electric field oriented in a first predetermined direction;

receiving means including a probe which is aligned at a predetermined small angle with respect to a second predetermined direction which is substantially orthogonal with respect to said first predetermined direction for receiving plane polarized electromagnetic energy having an electrical field oriented in said second predetermined direction and said plane polarized electromagnetic energy having an electric field oriented in said first predetermined direction in a proportion in accordance with said predetermined small angle so that said received plane polarized electromagnetic energy having an electric field oriented in said first predetermined direction is combined with said received plane polarized electromagnetic energy having an electric field oriented in said second predetermined direction, said receiving means including detecting means for detecting a low frequency component of said combined received electromagnetic energies for providing an output signal which is indicative of an intrusion; and duplexing means for converting said generated plane polarized electromagnetic energy into circularly polarized electromagnetic energy for communicating said circularly polarized energy to said antenna means for radiation therefrom, for converting said circularly polarized electromagnetic energy received by said antenna means into plane polarized electromagnetic energy having an electrical field in said second predetermined direction, and for communicating said received plane polarized electromagnetic energy to said receiving means in a manner so that said polarizing means provides substantial isolation between said received electromagnetic energy and said generated electromagnetic energy.

45. An intrusion detection system according to claim 44 further including a tuning member disposed oppositely of said receiving means probe which extends in said second predetermined direction.

46. An intrusion detection system according to claim 44 further including a tuning member extending in said first predetermined direction.

47. An intrusion detection system according to claim 46 wherein said tuning member is aligned with said first predetermined direction.

48. An intrusion detection system according to claim 44 wherein said electromagnetic energy is in the microwave range.

* * * * *

UNITED STATES PATENT OFFICE
CERTIFICATE OF CORRECTION

Patent No. 3,806,941          Dated April 23, 1974

Inventor(s)   James Cheal

It is certified that error appears in the above-identified patent and that said Letters Patent are hereby corrected as shown below:

Column 6, line 51, after "energy" insert --and said generated electromagnetic energy--. Column 8, line 38, "turning" should be --tuning--; line 42, "turning" should be --tuning--; line 50, "turning" should be --tuning--. Column 10, line 12, "enrergy" should be --energy--.

Signed and sealed this 27th day of August 1974.

(SEAL)
Attest:

McCOY M. GIBSON, JR.          C. MARSHALL DANN
Attesting Officer             Commissioner of Patents